United States Patent
Gong

[11] Patent Number: 6,125,228
[45] Date of Patent: Sep. 26, 2000

[54] APPARATUS FOR BEAM SPLITTING, COMBINING WAVELENGTH DIVISION MULTIPLEXING AND DEMULTIPLEXING

[75] Inventor: Qian Gong, Columbia, Md.

[73] Assignee: Swales Aerospace, Inc., Beltsville, Md.

[21] Appl. No.: 09/035,236

[22] Filed: Mar. 4, 1998

[51] Int. Cl.[7] ................................................. G02B 6/20
[52] U.S. Cl. ......................... 385/146; 385/125; 385/37; 385/33; 385/46
[58] Field of Search .................................... 385/125, 146, 385/33, 34, 35, 46, 37

[56] References Cited

U.S. PATENT DOCUMENTS

| | | | |
|---|---|---|---|
| 3,633,034 | 1/1972 | Uchida et al. | 250/199 |
| 4,482,994 | 11/1984 | Ishikawa | 370/3 |
| 4,707,064 | 11/1987 | Dobrowolski et al. | 350/96.19 |
| 4,763,317 | 8/1988 | Lehman et al. | 370/58 |
| 4,813,765 | 3/1989 | Negishi | 350/586 |
| 5,059,013 | 10/1991 | Jain | 359/503 |
| 5,303,077 | 4/1994 | Böttle et al. | 359/123 |
| 5,315,423 | 5/1994 | Hong | 359/124 |
| 5,396,570 | 3/1995 | Jenkins et al. | 385/28 |
| 5,457,556 | 10/1995 | Shiragaki | 359/117 |
| 5,475,776 | 12/1995 | Jenkins et al. | 385/28 |
| 5,533,163 | 7/1996 | Muendel | 385/126 |
| 5,537,239 | 7/1996 | Sotom et al. | 359/117 |
| 5,625,738 | 4/1997 | Magarill | 385/146 |

FOREIGN PATENT DOCUMENTS 64-57245  3/1989  Japan .

WO97/00416  1/1997  WIPO .

Primary Examiner—Hung N. Ngo
Attorney, Agent, or Firm—Roberts, Abokhair, & Mardula

[57] ABSTRACT

The present invention uses a light-pipe for beam splitting, combining, hybrid space-wavelength multiplexing, hybrid space-wavelength demultiplexing, dense wavelength division multiplexing, and dense wavelength division demultiplexing. A light-pipe has a first end where light enters the light-pipe and a second end where the light exits the light-pipe. The light-pipe is a polygonal rod or a hollow reflective cavity. To perform beam splitting, light enters the first end of the light-pipe and reflects off of the side surfaces inside the light-pipe producing additional light beams. By placing an imaging lens at the output end of the light-pipe, all of the virtual images (n−1) of the additional light beams and the original light entering the light-pipe become the object of the imaging lens. As a result, the light-pipe acts as a 1-to-n splitter. If the input signal, that is, the light entering the light-pipe, has more than one wavelength and a grating is added to the second end of the light-pipe, the device becomes a hybrid space-wavelength division multiplexer/demultiplexer. If the spacing between adjacent wavelengths is small, the light-pipe becomes a Dense Wavelength Division Demultiplexer. If the input and output are reversed, the beam splitter becomes a combiner. If the inputs have different wavelengths, the light-pipe becomes a Wavelength Division Multiplexer.

100 Claims, 3 Drawing Sheets

APPARATUS FOR BEAM SPLITTING, COMBINING WAVELENGTH DIVISION MULTIPLEXING AND DEMULTIPLEXING

FIELD OF THE INVENTION

This invention relates generally to increasing the bandwidth in fiber-optic networks. More particularly, the present invention is an apparatus for increasing the bandwidth for beam splitting, combining, hybrid space-wavelength multiplexing, hybrid space-wavelength demultiplexing, dense wavelength division multiplexing, and dense wavelength division demultiplexing in fiber-optic networks using a light-pipe.

BACKGROUND OF THE INVENTION

In today's "information age" everyone wants their telecommunication systems, telephones, computers, audiovisual, and networks to work faster. Computer users expect their computers to be faster, programs to run faster, etc. Internet users expect files to download faster. Network users expect their files to transfer faster. As the technology advances so does the expectation for faster systems. People no longer want to wait for technology, everyone wants their information immediately. Further efforts are underway to provide fiber optic cables to homes (known as fiber to the home or FTTH).

Systems are becoming faster because the systems are able to handle higher data throughput rates. One of the reasons that data throughput rates are increasing is because the systems are able to handle larger bandwidths. However, greater and greater numbers of such systems are coming online in homes and offices. This in turn increases the demand for even more bandwidth. The present invention increases the bandwidth for fiber-optic systems. More particularly, the present invention increases the amount of beam splitting, combining, and wavelength division multiplexing in a fiber optic system using a light-pipe.

Present fiber-optic systems, which are improvements over coaxial-cable systems, have been constantly challenged by the demand of higher connectivity and higher data throughput rates (bit rates). The higher connectivity requires splitters and combiners that are able to split and combine a large number of light beams. The higher bit rates are able to take full advantage of the large bandwidths offered by optic fibers. Wavelength Division Multiplexing (WDM) is yet another technique to exploit optical fiber's large bandwidth capacity by combining signals based upon differing wavelengths into a single fiber.

Fiber-optic splitters split the signal from one fiber to n output fibers. Some of the popular present day splitters are fused fiber splitters (also called fused tapered splitters), planar waveguide splitters and cube beam splitters. Gradient Index (GRIN) lens splitters can be used as well, but they are not commercially available. Each of these splitters has their own strength and weakness. Fused fiber splitters are the most popular splitters to provide a 1-to-n split. The weakness of fused fiber splitters is their wavelength and polarization dependence. Planar waveguide splitters have a similar performance as fused splitters, but produce a more uniform and stable output among the fibers. There is a tendency to replace fused fiber splitters with planar waveguide splitters. Cube beam splitters are not used in fiber-optic networks by themselves. Typically a cube beamsplitter is used with a GRIN lens to collimate the beam from the tip of the fiber. When the beam passes the cube beamsplitter, the beam splits into two beams. Two GRIN lenses are then used to focus the two beams into two output fibers. Compared with fused fiber splitters, cube beam splitters are larger and more expensive.

Combining a number of signals at the same wavelength is an important way to perform time-division multiplexing. This is a weak area in fiber-optic networks. Neither fused fiber splitters, planar waveguide splitters, nor cube splitters are bidirectional devices. When they are used as combiners, the insertion loss is large. Dense wavelength division multiplexing (DWDM) is a very efficient method to utilize the large bandwidth offered by optical fibers. DWDM combines N signals at N different wavelengths into a single fiber. Present day DWDMs are based on two techniques: (1) grating (including regular grating, fiber Bragg grating, and arrayed waveguide grating), and (2) narrow bandpass filter. These two techniques have successfully increased the bandwidth of existing fiber networks. However, these techniques are very expensive. Other weaknesses are that the wavelengths of the signals must be precise. Any wavelength shift will introduce large insertion loss. Changing wavelengths of signals is not a trivial task. The wavelengths are not flexible. After the system has been built, it is difficult to add new wavelengths to expand the system's capacity.

A need therefore exists for DWDMs that can be used in optic fiber networks to maximize the bandwidth that the optical fibers can handle, and to be flexible enough for adding more signal channels in the future. A need also exists for splitters and combiners used in fiber-optic networks to provide high connectivity for single and multi-mode fibers with true wavelength and polarization independence. There is a further need for these devices to be capable of being mass produced in large quantities and to be affordable for a variety of communication situations.

SUMMARY OF THE INVENTION

It is therefore an object of the present invention to increase the bandwidth, connectivity, and flexibility of fiber-optic networks.

It is a further object of the present invention to use a light-pipe as a DWDM (wavelength combiner) for fiber-optic networks.

It is a further object of the present invention to split and combine signals with low power loss.

It is a further object of the present invention to be able to provide a hybrid space-wavelength division splitter to make the connectivity even larger.

It is a further object of the present invention to provide splitter, combiner, and DWDM that are truly wavelength and polarization independent.

It is a further object of the present invention to produce a DWDM that can be produced in mass quantities in an affordable manner.

The present invention uses a light-pipe, which is also known as a Kaleidoscope, to achieve power splitting. A light-pipe has a first end where light enters the light-pipe and a second end where the light exits the light-pipe. A light-pipe is essentially a cylinder having a polygonal cross section and may be a solid rod or a hollow reflective cavity. For the solid rod, the cylinder can be made of glass, plastic, or other refractive materials. For the hollow rod, the cylinder can be made of any material with a high surface reflectivity. The rod or cavity can be triangular, square, rectangular, hexagonal, or other multi-faceted shapes depending on the number of times a beam is to be split. To perform beam splitting, which is also known as "space demultiplexing" in the communications field, light enters the first end or input end of the light-pipe.

The light can come from either an input fiber or a point source emitter. For light coming from an input fiber, the tip of the input fiber is placed at the center of the first end of the light pipe. In the preferred embodiment, the tip of the input fiber is placed at the center of the first end of the light-pipe, however in alternate embodiments, the tip does not have to be placed in the center. The light enters and propagates through the light-pipe. When the light hits each side surface of a solid light-pipe at an angle larger than the total internal reflection angle, the surfaces act like a mirror and reflect 100% of the light. When the light hits each side surface of a hollow light-pipe at any angle, the mirror surfaces provide a high reflectivity to the light. The reflections are folded and generate additional virtual point images. If the light-pipe is long enough, the folded beam will hit the side surfaces again, and generate additional virtual images. The longer the light-pipe, the greater the number of images that will be generated. By placing an imaging lens (or lens assembly) at the second end or output end of the light-pipe, all of the virtual images (n–1) and the light from the tip of the input fiber become the object of the imaging lens. A real image that consists of n spots will be formed in the image plane by the imaging lens. The n spots can then pass into n output fibers to establish a 1-to-n power split. The value of n is determined by the number of side surfaces of the cavity, the length of the light-pipe, and the numerical aperture of the input fiber. In a preferred embodiment, a one to nineteen (1–19) split has been accomplished in the present invention although this is not meant as a limitation. A one to nineteen splitter increases connectivity from one to nineteen. If the input and output are reversed, this same splitter becomes a nineteen to one combiner.

If the input signal, that is, the light beam entering the first end of the light-pipe, has more than one wavelength (i.e., a multiplexed signal) and a grating is added to the second end of the light-pipe (i.e., to demultiplex the individual wavelength signals), the device becomes a hybrid space-wavelength division multiplexer/demultiplex.

If the input and output are reversed, the splitter becomes a combiner having n inputs and one (1) output. Since the light-pipe combiner is wavelength independent, the wavelength of the inputs can range from one to n different wavelengths. When n inputs have n different wavelengths, the light-pipe becomes a hybrid space-wavelength division multiplexer (WDM). If the spacing between adjacent wavelengths is small, it is called a dense wavelength division multiplexer (DWDM). There are three advantages of the light-pipe DWDM of the present invention over present day DWDMs:

(a) Light-pipe DWDM itself does not have any restriction on wavelength spacing among input signals. The wavelength spacing can be as small as the input signals can provide;

(b) Input wavelengths of light-pipe DWDM are changeable and switchable, which provides a great flexibility for upgrading fiber optic networks in the future; and (c) The light-pipe DWDM can be cascaded to expand the bandwidth of networks at any time.

DETAILED DESCRIPTION OF THE INVENTION

For the purpose of this patent, the term fiber-optics comprises those components and fibers relying upon light as a means of transmitting signals and includes the term "optic-fiber."

Figure 1:
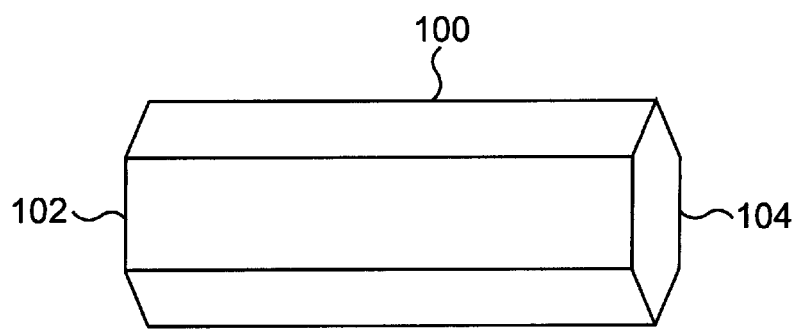
FIG. 1 shows a perspective view of a "space" splitter with a polygonal cross-section.

Referring to FIG. 1, a typical light-pipe having a hexagonal cross-section is shown, although this is not meant as a limitation. The shape of light-pipe 100 is a hexagonal glass rod with six parallel sides. The light-pipe has first end 102 and second end 104. Light enters first end 102 and exits second end 104. In order for the light to travel from first end 102 to second end 104 of light-pipe 100, light-pipe 100 must act like a reflective cavity. For a glass rod, the reflective cavity is formed by the total internal reflection of each side surface. For a hollow light-pipe the reflective cavity is formed with various reflective coatings.

A beam of light enters first end 102 of light-pipe 100 and due to total internal reflection, the light internally reflects inside the light-pipe producing multiple beams of light which exit second end 104. Since the light beam splits into multiple beams of light, the light-pipe is known as a splitter or beam splitter. In the telecommunication industry, the split is known as demultiplexing.

Figure 2:
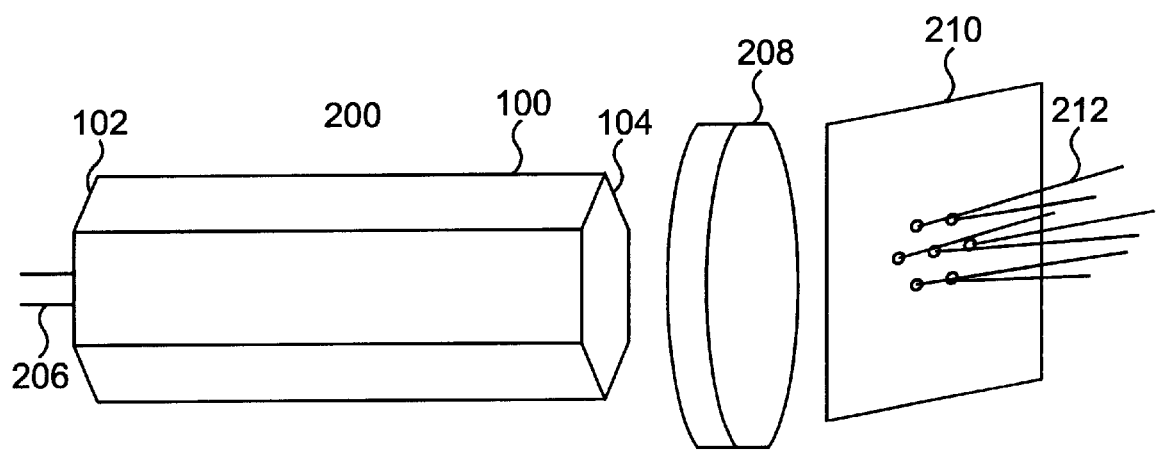
FIG. 2a shows a schematic of a "space" splitter.
FIG. 2b shows the pattern of point images of the "space" splitter's image plane.
Figure 2:
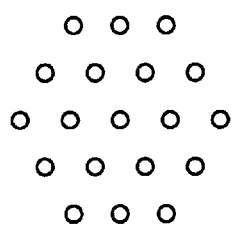

Referring to FIG. 2a, space splitter 200 having a polygonal shape is shown. Input fiber or point source emitter 206 is connected to first end 102 of light-pipe 100 and imaging lens 208 is positioned near second end 104 of light-pipe 100. In the preferred embodiment, the tip of input fiber 206, from which light exits, is placed at the center of first end 102 of light-pipe 100. Light propagates through input fiber 206 and into light-pipe 100. As the light propagates through light-pipe 100, the side surfaces of light-pipe 100 act as mirrors and reflect light. When the light hits the side surfaces, the light is folded by the side surfaces, and the reflection of the light creates six (6) virtual point images. When the light exits light-pipe 100, the light goes through imaging lens (or lens assembly) 208. All the images, real and virtual, become the object of imaging lens 208 and form seven (7) point images in image plane 210. These point images are then launched into seven (7) output fibers 212 to establish a 1-to-7 power split. In an alternative embodiment, the point images can enter one or more detectors. In alternate embodiments, the tip of input fiber 206 can be placed in an off center position in relation to first end 102 of light-pipe 100, and the tip of input fiber 206 does not have to butt on the first end 102 of light-pipe 100.

The light-pipe in FIG. 2a has a hexagonal shaped cross section and produces six (6) virtual images. If the light-pipe had a different polygonal shape cross section, the reflected light would produce a different number of virtual point images. Depending on the length of the light-pipe, the light would continue reflecting off of the side surfaces and produce additional images. The longer the light-pipe, the greater number of reflections and virtual point images. The number (n) of images that can be produced are based on the number of side surfaces, the length of the light-pipe, and the numerical aperture of the input fiber.

Referring to FIG. 2b, the pattern in the image plane for the hexagonal shaped light-pipe with two folds is shown. Light from the input fiber enters the light-pipe and propagates through the light-pipe. After the first reflection, a total of six (6) additional virtual point images are produced. The light reflects a second time producing an additional twelve (12) virtual point images. When the light exits the light-pipe and imaging lens, there are a total of nineteen (19) virtual point images produced: the original beam of light plus two sets of reflected beams of light.

In order to make space splitter 200 more compact or more affordable, imaging lens 208 can be affixed to or made an integral part of second end 104 of light-pipe 100 by curving second end 104 of light-pipe 100. Imaging lens 208 can also be a diffractive lens that is affixed to or made an integral part of second end 104 of light-pipe 100.

If the input and output are reversed, the splitter becomes a combiner having N inputs and one (1) output. The inputs can have any wavelengths, same or different. If N inputs have the same wavelength, the light-pipe will act as a space combiner. If N inputs have n different wavelengths, the light-pipe will act as a hybrid space-wavelength division multiplexer (WDM). If N inputs have n different wavelengths with a narrow spacing between adjacent wavelengths, the light-pipe will act as a dense wavelength division multiplexer (DWDM).

Figure 3:
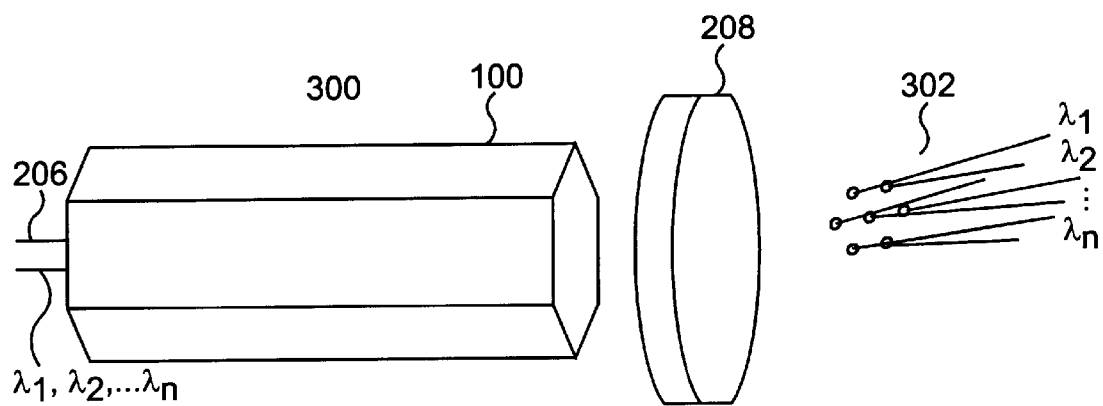
FIG. 3 shows a perspective view of a dense wavelength division multiplexer.

Referring to FIG. 3, a DWDM is shown. As shown, DWDM 300 includes light-pipe 100 having a polygonal cross section, input fibers or point source emitters 302, and imaging lens 208. The lights emanating from the tips of N input fibers or point source emitters 302 carry n different wavelengths. The light beams pass through imaging lens 208 and enter light-pipe 100. The light beams are imaged on the tip of output fiber 206. In an alternate embodiment, a detector can be used in place of output fiber 206. To date, a 7-to-1 DWDM has been accomplished in the present invention although this is not meant as a limitation.

Figure 4:
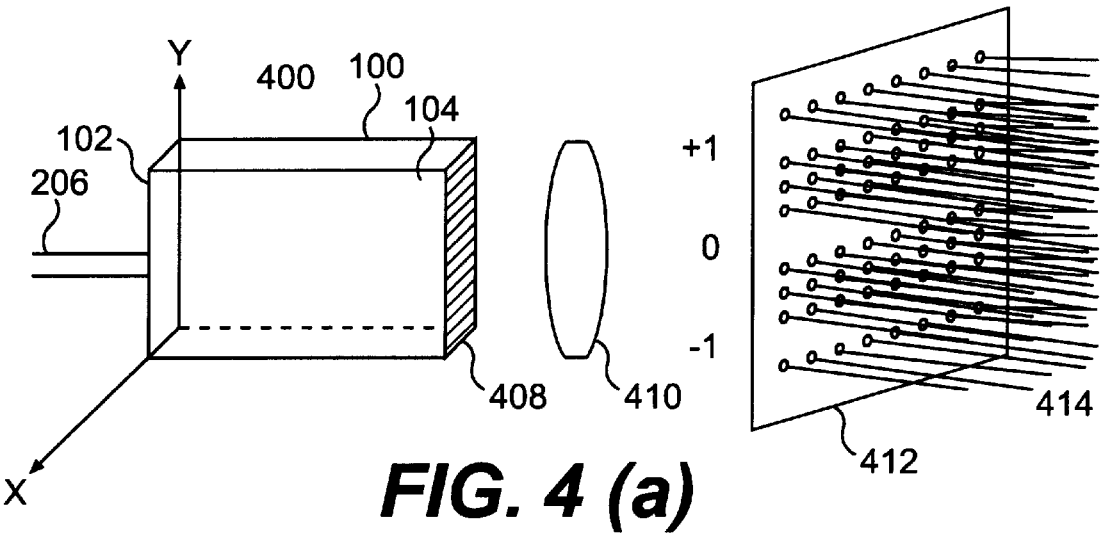
FIG. 4a shows a schematic of a hybrid "space-wavelength" splitter.
FIG. 4b shows the image pattern when no grating is used.
FIG. 4c shows the image pattern when a grating is used.
FIG. 4d shows the image pattern when a grating is used with m input wavelengths.

Referring to FIG. 4a, a space-wavelength division splitter is shown. As shown, space-wavelength division splitter 400 includes light-pipe 100 having a rectangular cross-section, input fiber or point source emitter 206, grating 408, and imaging lens 410. In the preferred embodiment, the tip of input fiber 206, from which the light exits, is connected to the center of the first end of light-pipe 102. The aspect ratio of the rectangular cross-section is such that the y dimension is much larger than the x dimension which allows the light to propagate through light-pipe 100 and fold only in the x direction. The light continues to propagate through light-pipe 100 and exits second end 104. Grating 408 is either constructed as an integral part of second end 104 or is affixed to second end 104, which introduces spectral dispersion to separate the light at different wavelengths into different angles. The light then passes through imaging lens 410. All images, real and virtual at different wavelengths, become the object of imaging lens 410 and form 2×n×m point images in image plane 412. Where n is the number of point images and m is the number of wavelengths. The light then passes through one or more output fibers 414 which deliver the light to the desired locations. In an alternate embodiment, the light enters one or more detectors instead of the output fibers.

Referring to FIG. 4b, a pattern of n point images when no grating is used is shown. The n point images 420 are aligned in a single line.

Referring to FIG. 4c, the image pattern when a grating is used for the input signal with only one wavelength $\lambda_1$ is shown. The spots in the image plane are aligned in two lines. This occurs because the grating is designed to have the most power concentrated on +1 order 422 and −1 order 424. In alternate embodiments, the grating can distribute the power to different orders to produce different image patterns.

Referring to FIG. 4d, the pattern of point images when a grating for m input wavelengths is shown. When the input signal has m wavelengths from $\lambda_1$ to $\lambda_m$, the spots in the image plane will be aligned in 2×n lines to provide a 2×m×n split. The −1 order 434 has lines of point images from $\lambda_1$) 426 to $\lambda_m$ 428. The +1 order 436 has lines of point images from $\lambda_1$ 430 to $\lambda_m$ 432.

By integrating the splitter and wavelength division splitter to form a space-wavelength division splitter into a single device, the overall device is simpler in design, more efficient, smaller and less expensive then combining the individual devices.

Although the present invention have been described in detail for purpose of illustration, it is understood that such detail is solely for that purpose, and variations can be made therein by those skilled in the art without departing from the scope of the invention. For example, the light-pipe can also be used as a general beam splitter and combiner to perform the power split and combination in the following areas: (1) laser combiner for laser communication; (2) beamsplitter for medical instruments; (3) fiber optic multiplexer/demultiplexer for structure monitoring; (4) fiber optic multiplexer/demultiplexer for super computer interconnection; and (5) beamsplitter for optical data storage. The present invention is defined by the following claims.

What is claimed is:

1. A light-pipe used for beam splitting in fiber-optic networks comprising:
   a light-pipe comprising a first end, a polygonal cross section, internal reflective surfaces, and a second end;
   a light input means proximate to the first end; and
   a lens located proximate to the second end, where at least one beam of light enters the first end of the light-pipe through the light input means, propagates through the light-pipe and is internally reflected inside the light-pipe producing a plurality of light beams which exit the second end and continue propagating through the lens.

2. The light-pipe as in claim 1, where the light-pipe is a hollow cylinder.

3. The light-pipe as in claim 2, where the lens is attached to the second end of the light-pipe.

4. The light-pipe as in claim 3, where the lens is attached to the second end of the light-pipe with an adhesive.

5. The light-pipe as in claim 2, where the internal reflective surface further comprises a reflective coating.

6. The light-pipe as in claim 2, where at least one beam of light is supplied by one input optic fiber to the first end of the light-pipe.

7. The light-pipe as in claim 2, where a plurality of light beams are supplied by a plurality of optic fibers to the first end of the light-pipe.

8. The light-pipe as in claim 2, where at least beam of light is supplied by one point source emitter to the first end of the light-pipe.

9. The light-pipe as in claim 2, where a plurality of light beams are supplied by a plurality of point source emitters to the first end of the light-pipe.

10. The light-pipe as in claim 2, where the light continues propagating through the lens and into one or more output fibers.

11. The light-pipe as in claim 2, where the light continues propagating through the lens and into one or more detectors.

12. The light-pipe as in claim 2, where the shape of the polygonal cross section is selected from the group consisting of triangular, square, rectangular, hexagonal, and octagonal shapes.

13. The light-pipe as in claim 2, where the lens is an imaging lens.

14. The light-pipe as in claim 1, where the light-pipe is a solid cylinder.

15. The light-pipe as in claim 14, where the lens is attached to the second end of the light-pipe.

16. The light-pipe as in claim 15, where the lens is attached to the second end of the light-pipe with an adhesive.

17. The light-pipe as in claim 14, where the second end of the light-pipe is curved to form a lens.

18. The light-pipe as in claim 17, where the lens is an imaging lens.

19. The light-pipe as in claim 14, where at least one beam of light is supplied by one input optic fiber to the first end of the light-pipe.

20. The light-pipe as in claim 14, where a plurality of light beams are supplied by a plurality of optic fibers.

21. The light-pipe as in claim 14, where at least one beam of light is supplied by one point source emitter to the first end of the light-pipe.

22. The light-pipe as in claim 14, where a plurality of light beams are supplied by a plurality of point source emitters to the first end of the light-pipe.

23. The light-pipe as in claim 14, where the light continues propagating through the lens and into one or more output fibers.

24. The light-pipe as in claim 14, where the light continues propagating through the lens and into one or more detectors.

25. The light-pipe as in claim 14, where the shape of the polygonal cross section is selected from the group consisting of triangular, square, rectangular, hexagonal, and octagonal shapes.

26. The light-pipe as in claim 14, where the lens is an imaging lens.

27. A light-pipe used for beam combining in fiber-optic networks comprising:
   a light-pipe comprising a first end, a polygonal cross section, internal reflective surfaces, and a second end;
   a light output means proximate to the first end; and
   a lens located proximate to the second end, where a plurality of light beams propagate through the lens and enter the second end of the light-pipe where the light is internally reflected and combined inside the light-pipe and one beam of light exits the first end of the light-pipe through the light output means.

28. The light-pipe as in claim 27, where the light-pipe is a hollow cylinder.

29. The light-pipe as in claim 28, where the lens is attached to the second end of the light-pipe.

30. The light-pipe as in claim 29, where the lens is attached to the second end of the light-pipe with an adhesive.

31. The light-pipe as in claim 28, where the internal reflective surface further comprises a reflective coating.

32. The light-pipe as in claim 28, where the plurality of light beams are supplied by at least one optic fiber.

33. The light-pipe as in claim 28, where the plurality of light beams are supplied by at least one point source emitter.

34. The light-pipe as in claim 28, where the light beam exits the light-pipe through the first end and propagates through a fiber optic.

35. The light-pipe as in claim 28, where the light beam exits the light-pipe through the first end and enters a detector.

36. The light-pipe as in claim 28, where the shape of the polygonal cross section is selected from the group consisting of triangular, square, rectangular, hexagonal, and octagonal shapes.

37. The light-pipe as in claim 28, where the lens is an imaging lens.

38. The light-pipe as in claim 27, where the light-pipe is a solid cylinder.

39. The light-pipe as in claim 38, where the lens is attached to the second end of the light-pipe.

40. The light-pipe as in claim 39, where the lens is attached to the second end of the light-pipe with an adhesive.

41. The light-pipe as in claim 38, where the second end of the light-pipe is curved to form a lens.

42. The light-pipe as in claim 41, where the lens is an imaging lens.

43. The light-pipe as in claim 38, where the plurality of light beams are supplied by at least one optic fiber.

44. The light-pipe as in claim 38, where the plurality of light beams are supplied by at least one point source emitter.

45. The light-pipe as in claim 38, where the light beam exits the light-pipe through the first end and propagates through a fiber optic.

46. The light-pipe as in claim 38, where the light beam exits the light-pipe through the first end and enters a detector.

47. The light-pipe as in claim 38, where the shape of the polygonal cross section is selected from the group consisting of triangular, square, rectangular, hexagonal, and octagonal shapes.

48. The light-pipe as in claim 38, where the lens is an imaging lens.

49. A light-pipe used for hybrid space-wavelength division demultiplexing in fiber-optic networks comprising:
   a light-pipe comprising a first end, a polygonal cross section, internal reflective surfaces, and a second end;
   a grating attached to the second end of the light-pipe; and
   a lens proximate to the grating, where at least one beam of light comprising a plurality of wavelengths enters the first end of the light-pipe, propagates through the light-pipe and is internally reflected inside the light-pipe producing a plurality of light beams which exit the second end of the light-pipe and continue propagating through the grating separating the beams of light into different wavelengths and propagate through the lens.

50. The light-pipe as in claim 49, where the light-pipe is a hollow cylinder.

51. The light-pipe as in claim 50, where the lens is attached to the second end of the light-pipe.

52. The light-pipe as in claim 51, where the lens is attached to the second end of the light-pipe with an adhesive.

53. The light-pipe as in claim 50, where the internal reflective surface further comprises a reflective coating.

54. The light-pipe as in claim 50, where at least one beam of light is supplied by one input optic fiber to the first end of the light-pipe.

55. The light-pipe as in claim 50, where a plurality of light beams are supplied by a plurality of optic fibers to the first end of the light-pipe.

56. The light-pipe as in claim 50, where at least one beam of light is supplied by one point source emitter to the first end of the light-pipe.

57. The light-pipe as in claim 50, where a plurality of light beams are supplied by a plurality of point source emitters to the first end of the light-pipe.

58. The light-pipe as in claim 50, where the light continues propagating through the lens and into one or more output fibers.

59. The light-pipe as in claim 50, where the light continues propagating through the lens and into one or more detectors.

60. The light-pipe as in claim 50, where the shape of the polygonal cross section is selected from the group consisting of triangular, square, rectangular, hexagonal, and octagonal shapes.

61. The light-pipe as in claim 50, where the lens is an imaging lens.

62. The light-pipe as in claim 50, where the plurality of wavelengths further comprise adjacent wavelengths which are separated by narrow spacings and cause the light-pipe to act as a dense wavelength division demultiplexer.

63. The light-pipe as in claim 49, where the light-pipe is a solid cylinder.

64. The light-pipe as in claim 63, where the lens is attached to the second end of the light-pipe.

65. The light-pipe as in claim 64, where the lens is attached to the second end of the light-pipe with an adhesive.

66. The light-pipe as in claim 63, where the second end of the light-pipe is curved to form a lens.

67. The light-pipe as in claim 66, where the lens is an imaging lens.

68. The light-pipe as in claim 63, where at least one beam of light is supplied by one input optic fiber to the first end of the light-pipe.

69. The light-pipe as in claim 63, where a plurality of light beams are supplied by a plurality of optic fibers to the first end of the light-pipe.

70. The light-pipe as in claim 63, where at least one beam of light is supplied by one point source emitter to the first end of the light-pipe.

71. The light-pipe as in claim 63, where a plurality of light beams are supplied by a plurality of point source emitters to the first end of the light-pipe.

72. The light-pipe as in claim 63, where the light continues propagating through the lens and into one or more output fibers.

73. The light-pipe as in claim 63, where the light continues propagating through the lens and into one or more detectors.

74. The light-pipe as in claim 63, where the shape of the polygonal cross section is selected from the group consisting of triangular, square, rectangular, hexagonal, and octagonal shapes.

75. The light-pipe as in claim 63, where the lens is an imaging lens.

76. The light-pipe as in claim 63, where the plurality of wavelengths further comprise adjacent wavelengths which are separated by narrow spacings and cause the light-pipe to act as a dense wavelength division demultiplexer.

77. A light-pipe used for hybrid space-wavelength division multiplexing comprising:

a light-pipe having a first end, a polygonal cross section, internal reflective surfaces, and a second end;

a grating attached to the second end of the light-pipe; and a lens proximate to the grating, where a plurality of light beams having at least one wavelength propagates through the lens, then the grating, and enters the second end of the light-pipe where the light is internally reflected and combined inside the light-pipe and one beam of light exits the first end of the light-pipe.

78. The light-pipe as in claim 77, where the light-pipe is a hollow cylinder.

79. The light-pipe as in claim 78, where the lens is attached to the second end of the light-pipe.

80. The light-pipe as in claim 79, where the lens is attached to the second end of the light-pipe with an adhesive.

81. The light-pipe as in claim 78, where the internal reflective surface further comprises a reflective coating.

82. The light-pipe as in claim 78, where the plurality of light beams are supplied by a plurality of optic fibers.

83. The light-pipe as in claim 78, where the plurality of light beams are supplied by a plurality of point source emitters.

84. The light-pipe as in claim 78, where the light beam exits the light-pipe through the first end and propagates through a fiber optic.

85. The light-pipe as in claim 78, where the light beam exits the light-pipe through the first end and enters a detector.

86. The light-pipe as in claim 78, where the shape of the polygonal cross section is selected from the group consisting of triangular, square, rectangular, hexagonal, and octagonal shapes.

87. The light-pipe as in claim 78, where the lens is an imaging lens.

88. The light-pipe as in claim 78, where the plurality of wavelengths further comprise adjacent wavelengths which are separated by narrow spacings and cause the light-pipe to act as a dense wavelength division multiplexer.

89. The light-pipe as in claim 77, where the light-pipe is a solid cylinder.

90. The light-pipe as in claim 89, where the lens is attached to the second end of the light-pipe.

91. The light-pipe as in claim 90, where the lens is attached to the second end of the light-pipe with an adhesive.

92. The light-pipe as in claim 89, where the second end of the light-pipe is curved to form a lens.

93. The light-pipe as in claim 92, where the lens is an imaging lens.

94. The light-pipe as in claim 89, where the plurality of light beams are supplied by a plurality of optic fibers.

95. The light-pipe as in claim 89, where the plurality of light beams are supplied by a plurality of point source emitters.

96. The light-pipe as in claim 89, where the light beam exits the light-pipe through the first end and propagates through a fiber optic.

97. The light-pipe as in claim 89, where the light beam exits the light-pipe through the first end and enters a detector.

98. The light-pipe as in claim 89, where the shape of the polygonal cross section is selected from the group consisting of triangular, square, rectangular, hexagonal, and octagonal shapes.

99. The light-pipe as in claim 89, where the lens is an imaging lens.

100. The light-pipe as in claim 89, where the plurality of wavelengths further comprise adjacent wavelengths which are separated by narrow spacings and cause light-pipe to act as a dense wavelength division multiplexer.

* * * * *

UNITED STATES PATENT AND TRADEMARK OFFICE
CERTIFICATE OF CORRECTION

PATENT NO. : 6,125,228  
APPLICATION NO. : 09/035236  
DATED : September 6, 2000  
INVENTOR(S) : Qian Gong Page 1 of 1

It is certified that error appears in the above-identified patent and that said Letters Patent is hereby corrected as shown below:

In the specification:

| | | |
|---|---|---|
| COLUMN 3, | LINE 38, | change "multiplexer/demultiplex" to --multiplexer/demultiplexer-- |
| COLUMN 6, | LINE 8, | change "-1 order" to --+1 order-- |
| COLUMN 6, | LINE 8, | at the end of the line, delete ")" |
| COLUMN 6, | LINE 9, | change "+1 order" to -- -1 order-- |

In the claims:

CLAIM 8,     COLUMN 6,   LINE 53,     after "least" and before "beam" insert --one--

CLAIM 100,   COLUMN 10,  LINE 59,     after "cause" and before "light-pipe" insert --the--

Signed and Sealed this

Fifteenth Day of September, 2009

David J. Kappos  
*Director of the United States Patent and Trademark Office*